US008245135B2

(12) United States Patent  
Cai et al.

(10) Patent No.: US 8,245,135 B2  
(45) Date of Patent: Aug. 14, 2012

(54) PRODUCING A VISUAL SUMMARIZATION OF TEXT DOCUMENTS

(75) Inventors: Wei Jia Cai, Beijing (CN); Xiao Xiao Lian, Beijing (CN); Shixia Liu, Beijing (CN); Shimei Pan, Elmsford, NY (US); Wei Hong Qian, Beijing (CN); Yang Qiu Song, Beijing (CN); Qiang Zhang, Beijing (CN); Michelle Xue Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 12/555,351

(22) Filed: Sep. 8, 2009

(65) Prior Publication Data

US 2011/0060983 A1    Mar. 10, 2011

(51) Int. Cl.
*G06F 17/00* (2006.01)
*G06F 17/30* (2006.01)

(52) U.S. Cl. ........ 715/254; 715/255; 715/711; 707/708; 707/738

(58) Field of Classification Search .................. 715/200, 715/201, 205, 209, 226, 229, 231, 254, 256, 715/273, 711, 713, 731, 752, 760; 707/602, 707/737, 738, 748, 749, 705, 708, 798, 912, 707/917, E17.046

See application file for complete search history.

(56) References Cited

U.S. PATENT DOCUMENTS

| | | | | |
|---|---|---|---|---|
| 6,012,053 | A * | 1/2000 | Pant et al. | 1/1 |
| 7,152,064 | B2 * | 12/2006 | Bourdoncle et al. | 1/1 |
| 7,194,483 | B1 * | 3/2007 | Mohan et al. | 707/600 |
| 7,298,930 | B1 * | 11/2007 | Erol et al. | 382/305 |
| 7,536,413 | B1 * | 5/2009 | Mohan et al. | 1/1 |
| 7,607,083 | B2 * | 10/2009 | Gong et al. | 715/254 |
| 7,752,198 | B2 * | 7/2010 | Canright et al. | 707/723 |
| 7,769,749 | B2 * | 8/2010 | He | 707/722 |
| 2002/0052894 | A1 * | 5/2002 | Bourdoncle et al. | 707/513 |
| 2003/0037074 | A1 * | 2/2003 | Dwork et al. | 707/500 |
| 2005/0246328 | A1 * | 11/2005 | Zhang et al. | 707/3 |
| 2008/0275862 | A1 * | 11/2008 | Liu et al. | 707/5 |
| 2008/0313168 | A1 * | 12/2008 | Liu et al. | 707/5 |

OTHER PUBLICATIONS

D. Blei et. al., "Latent Dirichlet Allocation", Journal of Machine Learning Research, p. 993-1022, 2003.

E. Bier et. al., "Toolglass and Magic Lenses: the See-Through interface", SIGGRAPH '93, pp. 73-80.

L. Byron et. al., "Stacked Graphs-Geometry & Aesthetics", InfoVis '08, pp. 1245-1252.

(Continued)

*Primary Examiner* — Maikhanh Nguyen

(74) *Attorney, Agent, or Firm* — William J. Stock

(57) ABSTRACT

A method and system of producing a visual text summarization. According to the method, a plurality of topics may be extracted from a collection of text documents, where each of the topics comprises a distribution of topic keywords. An importance ranking for each of the topics may be determined, and an importance ranking for each of the topic keywords of a topic may also be determined. A graph may be displayed having a plurality of stacked layers representing a group of topics selected from the plurality of topics based on the importance ranking of the topics. A keyword cloud within each layer of the graph may also be displayed, where the one keyword cloud is a group of topic keywords selected from the extracted topic keywords based on the importance ranking of the extracted topic keywords.

19 Claims, 6 Drawing Sheets

OTHER PUBLICATIONS

G. Carenini et. al., "Summarizing Email Conversations with Clue Words", WWW 2007, pp. 91-100.
C. Clarke et. al., "Novelty and Diversity in Information Retrieval Evaluation", SIGIR '08, pp. 659-666.
A. Don et. al., "Discovering Interest Usage Patterns in Text Collections: Integrating Text Mining with Visualization", CKM '07, pp. 213-222.
M. Dredze et. al., "Generating Summary Keywords for Emails Using Topics", IUI, '08, pp. 199-206.
S. Havre et. al., "Visualizing Thematic Changes in Large Document Collections", 2002, pp. 9-20, vol. 8.
M. Hearst, "Tilebars: Vizualization of Term Distribution Information in Full Text Information Access", CHI '95, pp. 59-66.
T. Iwata. et. al., "Probabalistic Latent Semantic Visualization: Topic Models for Visualizing Documents", KDD '08, pp. 363-371.
B. Kerr, "Thread Arcs: An Email Thread Visualization", InfoVis '03, pp. 211-318.
M. Luboschik et. al., Particle-Based Labeling: Fast-Point Feature Labeling Without Obscuring Other Visual Features. InfoVis '08, pp. 1237-1244.
A. McCallum et. al., "Topic and Role Discovery in Social Networks with Experiments on Enron and Academic Email", J. of Artificial Intelligence Research, 2007, pp. 249-272.
B. Nardi et. al., "Integrating Communication and Information Through Contactmap", Comm ACM, 2002, pp. 89-95.
A. Perer et. al., Contrasting Portraits of Email Practices: Visual Approaches to Reflection and Analysis. AVI '06, pp. 389-395.
E. Rennison et. al., "Galaxy of News: An Approach to Visualizing and Understanding Expansive News Landscapes", UIST '94, pp. 3-12.
M. Sarkar et. al., "Graphical Fisheye View". Comm. ACM, 1994, pp. 73-83.
J. Stasko et. al., "Supporting Investigative Analysis Through Interactive Visualization", Information Visualization, 2008, pp. 118-132.
S. Wan et. al., "Generating Overview Summaries of Ongoing Email Thread Discussions", COLING '04, pp. 549-555.
D. Wang et. al., "Multi-Document Summarization via Sentence-Level Semantic Analysis and Symetric Matrix Factorization", SIGIR '08, pp. 307-314.
M. Wattenberg et. al., "The Word Tree, an Interactive Visual Concordance", InfoVis '08, pp. 1221-1228.
J. Wise et al., "Visualizing the Non-Visual: Spatial Analysis and Interaction with Information from Text Documents". InfoVis '95, pp. 51-58.
R. Arora et. al., Latent Dirichlet Allocation Based Multi-Document Summarization, AND, 2008, pp. 91-97.
A. Banerjee et. al., "Clustering with Bregman Divergences", Journal of Machine Learning Research, 2005, pp. 1705-1749.
S. Basu et. al., "A Probabilistic Framework for Semi-Supervised Clustering", SIGKDD, 2004, pp. 59-68.
D. Blei et. al., "Topic Models, chapter: Topic Models", 2009, Taylor and Francis.
D.M. Blei et. al., "Dynamic topic Models". Proceedings of ICML, 2006, pp. 113-120.
D. Cai et. al., "Modeling Hidden Topics on Document Manifold". Proceedings of CIKM, 2008, pp. 911-920.
D. Cai et. al., "Probabilistic Dyadic Data Analysis with Local and Global Consistency", Proceedings of ACM SIGKCDD, 2003, pp. 89-98.
S. Deerswester et. al., "Indexing by Latent Semantic Analysis", Journal of the American Society of Information Science, 1990, pp. 391-407.
I.S. Dhillon et. al., "Information Theoretic Co-Clustering", Proceedings of ACM SIGKDD, 1990, pp. 391-407.
Y. Gong et. al., "Generic Text Summarization Using Relevance Measure and Latent Semantic Analysis", SIGUR, 2001, pp. 19-25.
T.L. Griffiths et. al., "Finding Scientific Topics", Proceedings of the National Academy of Sciences, 2004, pp. 5228-5235.
A. Haghighi et. al., "Exploring Content Models for Multi-Document Summarization", 2009, Proceedings of HLT-NAACL.
X. He et. al., "Laplacian Score for Feature Selection", Proceedings of NIPS, 2005.
T. Hoffman, "Probabilistic Latent Semantic Analysis", Proceedings of UAI, 1999, pp. 289-296.
M. Lan et. al., A Comprehensive Comparative Study on Term Weighting Schemes for Text Categorization With Support Vector Machines, WWW, 2005, pp. 1032-1033.
J.H. Lee et. al., "Automatic Generic Document Summarization Based on non-Negative Matrix Factorization", Information Processing and Management, 2009, pp. 20-34.
A.K. McCallum. "Mallet: A Machine Learning for Language Toolkit", 2002.
O. Mei et. al., "Topic Modeling with Network Regularization", Proceedings of WWW, 2008, pp. 101-110.
P. Mitra et. al., "Unsupervised Feature Selection Using Feature Similarity", IEEE Transactions on Pattern Analysis and Machine Intelligence, 2002, pp. 301-312.
R. Nallapati et. al., "Event Threading Within News Topics", CIKM, 2004, pp. 446-453.
M. Sahami et. al., "Using Machine Learning to Improve Information Access", PhD Thesis, Department of Computer Science, Stanford University, USA, 1988.
K. Wagstaff et. al., Constrained k-means Clustering with Background Knowledge. Proceedings of ICML, 2001, pp. 307-314.
X. Wang et. al., "Topics Over Time: A non-Markov Continuous Time Model of Topical Trends", Proceedings of AMC SIGKDD, 2006, pp. 178-185.
X. Wei et. al., "Lda-based Document Models for ad-hoc retrieval", SIGIR, 2006, pp. 424-433.
E.P. Xing et. al., "Distance Metric Learning with Application to Clustering with Side-Information", Advances in NIPS, 2002, pp. 505-512.
Y. Yang et. al., "A Comparative Study on Feature Selection in text Categorization", Proceedings of ICML, 1997, pp. 412-420.
Y. Zhang et. al., "Segmentation of Brain MR Images Through a Hidden Markov Random Field Model . . . ", IEEE Transactions on Medical Imaging, 2001, pp. 45-57.
A. Leuski et. al., "iNeATS: Interactive Multi-Document Summarization", Association for Computer Linguistics, 2003.
R. Ando et. al. "Visualization-Enabled Multi-Document Summarization by Iterative Residual Rescaling", Cambridge University Press, Natural Language Engineering, 1-21, 2003.
G. Venolia et. al., "Understanding Sequence and Reply Relationships Within Email Conversations: A Mixed-Model Visualization", CHI '03, pp. 361-368.
F. Viergas et. al., "Visualizing Email Content: Portraying Email Relationships From Conversational Histories", CHI '06, pp. 979-988.

\* cited by examiner

Visualization 115a

Visualization 115b

Visualization 115c

Visualization 115d

Visualization 115e

PRODUCING A VISUAL SUMMARIZATION OF TEXT DOCUMENTS

BACKGROUND OF THE INVENTION

The present invention relates to a method of producing a visual summarization of text documents. More specifically, the present invention relates to a visual text analysis tool to aid users in analyzing a large collection of text documents. The location of critical information in a large collection of text documents, and/or gleaning of useful insights from such a collection, can be time consuming and laborious. An example of a large collection of text documents is a collection of emails.

To help cope with large collections of text documents, a number of tools have been developed to facilitate analysis. While many tools allow a user to run a simple text search through such a collection of documents, such a text search is of limited value in identifying, for example, patterns of appearances for particular terms. Further, data visualization tools have also been developed to facilitate data analysis but none facilitate a comprehensive analysis utilizing both meta data and data content.

The existing techniques are inadequate to support complex analyses required by many real-world applications. An example of a real-world application is a document review process that occurs during an investigation or discovery phase of litigation, where a reviewer may wish to analyze a large collection of documents to quickly and easily identify relevant documents to a particular issue or topic. The existing techniques are not practical because they do not provide the in-depth analysis required or are too time consuming.

SUMMARY OF THE INVENTION

Embodiments of the present invention provide a text analysis tool that integrates an interactive visualization with text summarization to visually summarize a collection of text documents.

In particular, an embodiment of the invention provides a method of producing a visual text summarization. A plurality of topics may be extracted from a collection of text documents, where each of the topics comprises a distribution of topic keywords. An importance ranking for each of the topics may be determined, and an importance ranking for each of the topic keywords of a topic may also be determined. A graph may be displayed having a plurality of stacked layers representing a group of topics selected from the plurality of topics based on the importance ranking of the topics. A keyword cloud within each layer of the graph may also be displayed, where the one keyword cloud is a group of topic keywords selected from the extracted topic keywords based on the importance ranking of the extracted topic keywords.

Another embodiment of the invention provides a system for producing a visual text summarization. A data storage device may store a collection of text documents. A text document pre-processor module may extract content and metadata from the collection of text documents. A topic summarizer module may extract a set of topics, associated probabilistic distributions and topic keywords from the context and meta data of the collection of text documents. A text visualizer module may transform the set of topics, the associated probabilistic distributions and the topic keywords into a visual text summarization. Lastly, a display device may display the visual text summarization.

Another embodiment of the invention provides a computer readable article of manufacture tangibly embodying computer readable instructions which when executed causes a computer to carry out the steps of the method described above.

DETAILED DESCRIPTION OF THE PREFERRED EMBODIMENTS

Embodiments of the present invention provide a text analysis tool that integrates an interactive visualization with text summarization to visually summarize a collection of text documents. In embodiments, the text summarization may involve extracting topics and topic keywords from a collection of text documents, with a topic representing the thematic content common to the collection of text documents and each topic being characterized by a distribution over a set of topic keywords. Each keyword may have a probability that measures the likelihood of the keyword appearing in the related topic. The interactive visualization may be a visual text summarization, particularly, a stacked graph wherein each layer represents a different topic.

Figure 1:
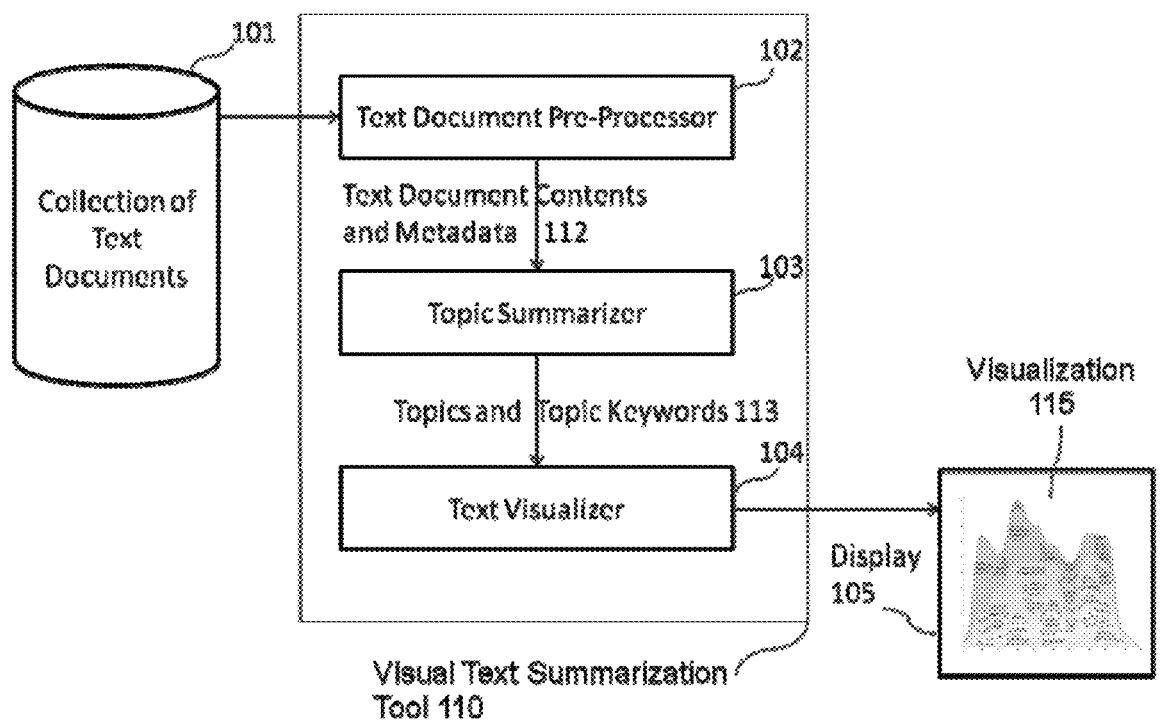
FIG. 1 is a block diagram that shows a visual text summation system according to embodiments of the present invention.

FIG. 1 is a block diagram that shows a visual text summation system according to embodiments of the present invention. FIG. 1 shows a collection of text documents 101, a visual text summarization tool 110, and a display 105. A collection of text documents may be, for example, email messages, news articles, financial documents, etc. Collection of text documents 101 may be stored in one or more memory devices, such as a disk drive, random access memory (RAM), etc., and may be part of the same system or stored separately from visual text summation tool 110. Visual text summation tool 110 may be a software application that is executing on a computer system, such as a person computer system, a laptop computer, a server, ext. As shown in FIG. 1, visual text summarization tool 110 includes a text document pre-processor 101, a topic summarizer 103, and a text visualizer 104. In embodiments, pre-processor 101, topic summarizer 103, and text visualizer 104 may be embodied in separate software modules in visual text summarization tool 110. As also show, the system may include a display 105 that is coupled to visual text summarization tool 110 and may be any type of display device on which a graph may be shown. In FIG. 1, display 105 is shown displaying visualization 115.

As shown in FIG. 1, the input to the text document pre-processor 102 may be the collection of text documents 101, and the output of the text document pre-processor 102 may be a collection of text document content and metadata 112. The metadata can include a time stamp, sender information and receiver information. The collection of text document content and metadata 112 that is output from the text document pre-processor 102 may be sent to the topic summarizer 103 that may extract a set of topics, associated probabilistic distributions and topic keywords 113. This output may be provided to the text visualizer 104, which may transform the summarization results into a comprehensible visual summary. Finally, the visual summary may be output to a display 105 where a user can interact with it and further examine the analysis results or express new analysis needs. As shown in FIG. 1, the visual summary may be represented as a stacked graph such as visualization 115, which is discussed in more detail with reference to FIGS. 4-8.

Figure 2:
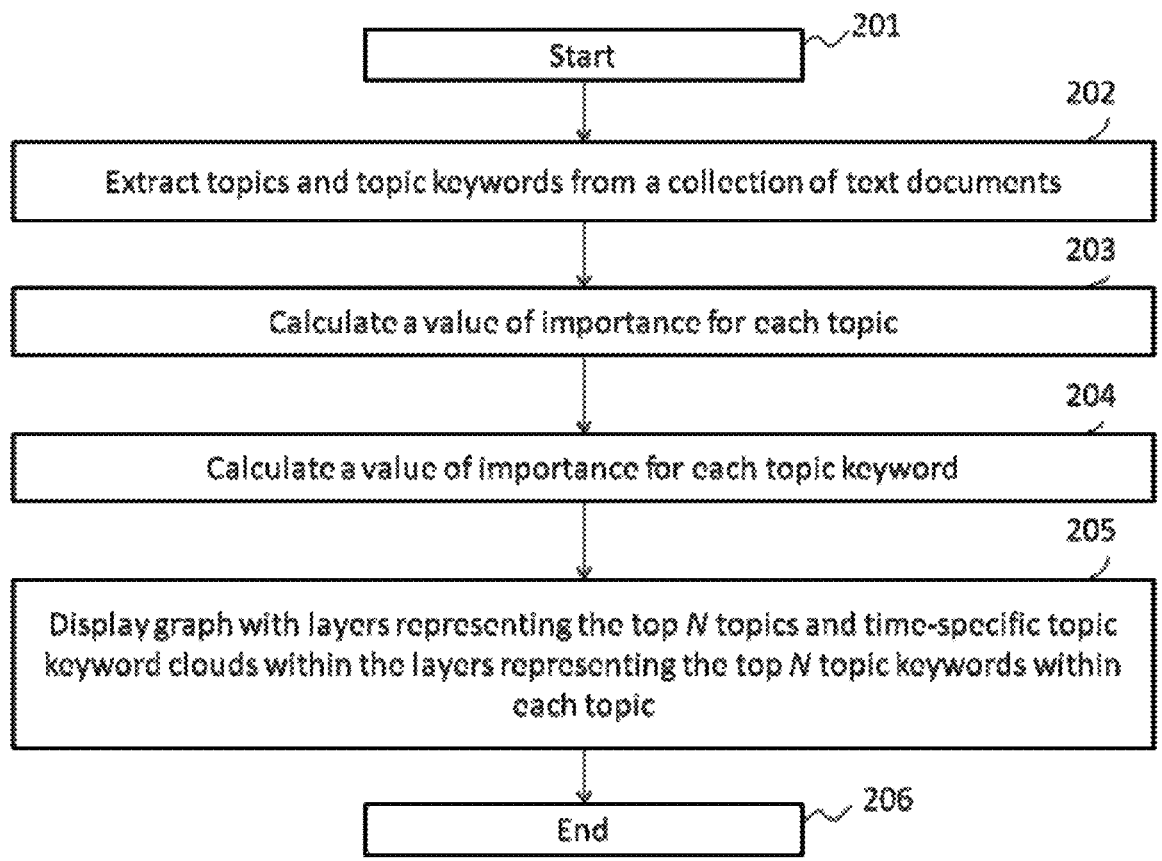
FIG. 2 is a flow chart that shows a process of visually summarizing textual information according to an embodiment of the present invention.

FIG. 2 is a flow chart that shows a process of visually summarizing textual information according to an embodiment of the present invention. This process may be implemented using the visual text summarization tool 110 of FIG. 1. As an example of the implementation of the process of FIG. 2, a user may execute text visualization summary tool 110 and input a collection of text documents 101, such as a collection of email messages that was obtained during the discovery phase of a litigation matter. The process starts at step 201. At step 202 the process extracts topics and topic keywords from the collection of text documents. This step may be performed by topic summarizer 103 of FIG. 1. The topics and topic keywords may be extracted from the collection of text documents using any known text analysis method. Examples of text analysis methods include text categorization techniques, text clustering techniques, latent semantic models, or other text mining techniques. The topics may be a set of topic keywords that allow a user to understand what information may be included in the documents pertaining to the topic. In the context of the litigation example, these topics may represent topics in conversations between victim and suspect, or topics that may incriminate a suspect in fraud. At step 203 the process determines an importance ranking for each topic. In the context of FIG. 1, step 203 may also be performed by topic summarizer 103. The method of determining the importance ranking for each topic can vary depending on the specific criteria or application. Examples of methods of determining importance ranking include (i) using a weighted mean and standard deviation of topic distributions, (ii) using Laplacian scores of topics, (iii) using pairwise mutual information of topics and (iv) using topic similarity between topics. At step 204 the process determines an importance ranking for each of the topic keywords in each topic. Again, the method of determining an importance ranking for each topic keyword within a topic can vary depending on the specific criteria. The methods of determining an importance ranking for topics and topic keywords will be described in detail later. Step 204 may also be implemented by topic summarizer 103 of FIG. 1. Continuing with step 205 the process displays a graph having layers representing the top N ranked topics and time-specific topic keyword clouds within the layers representing the top N ranked topic keywords within each topic. The top N topics and top N topic keywords correspond to the highest N importance ranked topics and topic keywords respectively. Examples of the graph displayed are shown as visualization 115 and 115a-115e of FIGS. 1 and 4-8. Step 205 may be implemented by text visualization 104 and display 105 of FIG. 1. Finally, the process ends at step 206.

Figure 3:
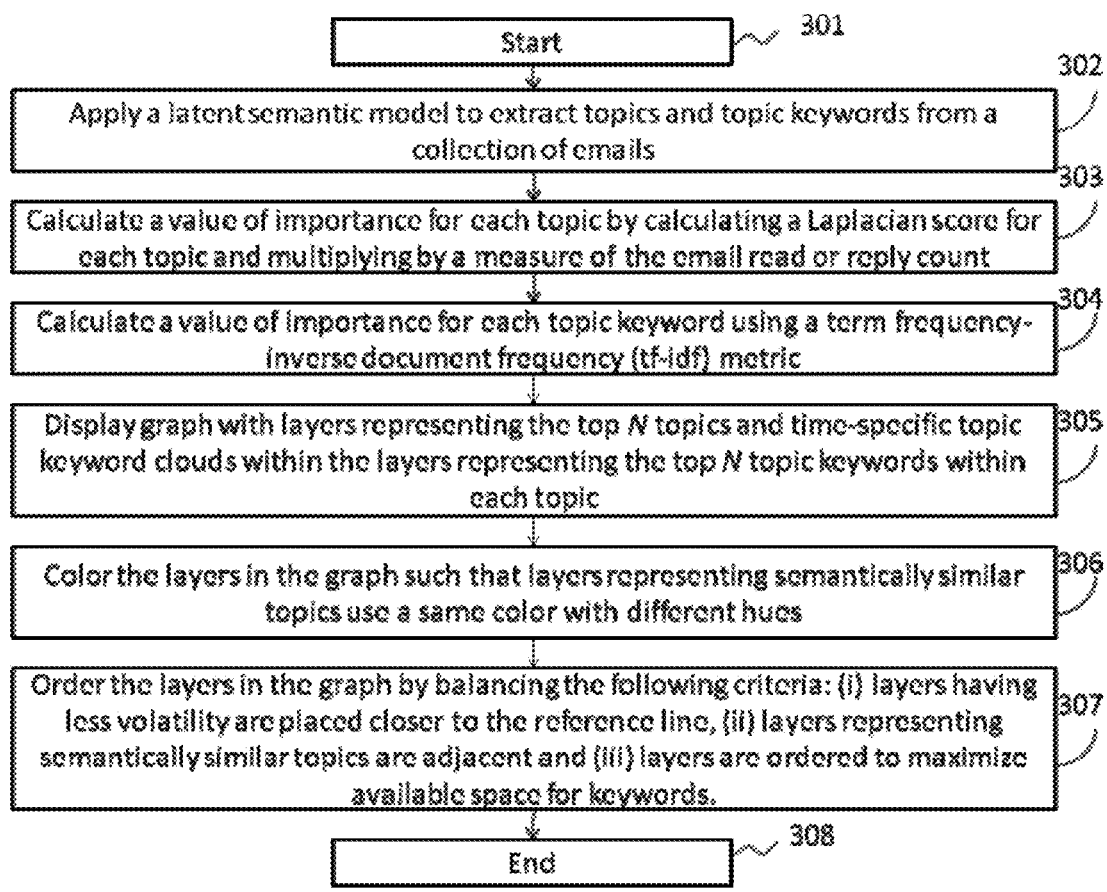
FIG. 3 is a flow chart that shows further details of a process of visually summarizing textual information according to an embodiment of the present invention.

FIG. 3 shows a process flowchart of an embodiment of the present invention. In the preferred embodiment shown in FIG. 3 the collection of text documents is a collection of emails. The process starts at step 301. At step 302 the process applies a latent semantic model, preferably, a latent Dirichlet allocation model to extract topics and topic keywords from a collection of emails. The latent Dirichlet allocation model will be described in detail later. At step 303 the process determines an importance ranking for each topic by calculating a Laplacian score for each topic and multiplying by a measure of the email read or reply count. The calculating of the Laplacian score, along with other importance ranking methods, will be described in detail later. At step 304 the process determines an importance ranking for each topic keyword using a term frequency-inverse document frequency (tf-idf) metric. The tf-idf metric will be described in detail later. Continuing with step 305 the process displays a graph having layers representing the top N ranked topics and time-specific topic keyword clouds within the layers representing the top N ranked topic keywords within each topic. The top N ranked topics and top N ranked topic keywords correspond to the highest N importance ranked topics and topic keywords respectively. Then, in step 306 the process colors the layers in the graph such that layers representing semantically similar topics use a same color with different hues. The semantic similarity of two topics is based on counting the number of the same documents belonging to both of them. Next, in step 307, the process orders the layers in the graph by balancing the following criteria: (i) layers having less volatility are placed closer to the reference line, (ii) layers representing semantically similar topics are adjacent and (iii) layers are ordered to maximize available space for keywords. The method used to order the layers will be described in detail later. Finally, the process ends at step 206.

In the preferred embodiment of the invention shown in FIG. 3, the step of extracting topics and topic keywords from a collection of text documents is carried out using a latent semantic model, as shown in step 302. Latent semantic models are effective for topic modeling and analysis of a collection of text documents. A preferred latent semantic model is a latent Dirichlet allocation (LDA) model as disclosed in D. Blei, A. Ng, and M. Jordan, "Latent Dirichlet Allocation", *Journal of Machine Learning Research,* 3:993-1022 (2003), the entire contents of which are incorporated herein by reference.

The preferred embodiment of the invention shown in FIG. 3 applies the LDA model to summarize an email collection at two levels. First, the LDA model is used to automatically extract a set of latent topics from the collection of text documents shown in step 302. Second, a keyword selection method is used to extract a set of document keywords from each text document in the collection of text documents using the results of the LDA model (step not shown in FIG. 3).

The LDA model is an unsupervised probabilistic topic modeling technique that automatically infers hidden variables reflecting the thematic structure of a collection of text documents. It is a word-based generative model that treats each document as a finite mixture over an underlying set of hidden themes. Moreover, each theme has a specific distribution of words. Given a collection of documents, statistical inference techniques are used to invert the generative process and derive the latent themes in the corpus as well as the document-specific topic mixtures.

More specifically, the corpus is denoted as $D=\{d_1, d_2, \ldots, d_M\}$ where $d_m$ is a document and M is the corpus size. Each document has a sequence of words $W_m=\{w_{m,1}, w_{m,2}, \ldots, w_m, N_m\}$, where $N_m$ is the number of words in each document. The dictionary is denoted as $V=\{v_1, v_2, \ldots, v_V\}$, where the vocabulary size is V. Moreover, z is a latent variable representing the latent topic associated with each observed word. We denote $Z_m=\{z_{m,1}, z_{m,2}, \ldots, z_m, N_m\}$ as the topic sequence associated with the word sequence $W_m$.

The generative procedure of LDA can be formally defined as:

1. For all the topics $k \in [1,K]$:
Choose a word distribution $\phi_k \sim Dir(\phi|\beta)$.
2. For each document $m \in [1,M]$:
2.1. Choose $N_m \sim Poisson(\xi)$
2.2. Choose a topic distribution $\theta_m \sim Dir(\theta|\alpha)$.
2.3. For all the words $w_{m,n}$ where $n \in [1,N_m]$ in document $d_m$:
Choose a topic index $z_{m,n} \sim Mult(z|\theta_m)$.
Choose a word $w_{m,n} \sim Mult(w|\phi_{zm;n})$.

Assuming $\phi_k=(\phi_{k,1}, \phi_{k,2}, \ldots, \phi_{k,V})^T \in R^V$ where $\phi_{k,i}=p(w=v_i|z=k)$, then, the parameters for the topic mixtures of LDA can be represented as $\Phi=(\phi_1, \phi_2, \ldots, \phi_K)^T \in R^{K \times V}$ where K is the topic number. Similarly, if we denote $\theta_m=(\theta_{m,1}, \theta_{m,2}, \ldots, \theta_{m,K})^T \in R^K$ where $\theta_{m,k}=p(z=k|d_m)$. Then the parameters for the document mixture of LDA is $\Theta=(\theta_1, \theta_2, \ldots, \theta_M)^T \in R^{M \times K}$.

Inferencing a topic model given a set of training documents mainly involves estimating the document-topic distribution $\Theta$ and the topic-word distribution $\Phi$. Since the maximum a posterior (MAP) estimation is intractable due to the coupling between model parameters and the hyperparameters, approximations are often used, such as collapsed Gibbs sampling and variational techniques.

An embodiment of the invention uses Gibbs sampling which is an MCMC algorithm. In each iteration of Gibbs sampling, the embodiment of the invention samples a topic assignment for each word in each document based on topic-word co-occurrences and document-topic co-occurrences. Finally, after the result converges, the embodiment of the invention estimates the expected posterior of Dirichlet distribution for $\Theta$ and $\Phi$ using the following formulas:

$$\hat{\theta}_{m,k} = \frac{u_{d_m,k} + \alpha_k}{\sum_{k=1}^{K}(u_{d_m,k} + \alpha_k)}$$

$$\hat{\varphi}_{k,t} = \frac{u_{k,vi} + \beta_i}{\sum_{i=1}^{V}(u_{k,vi} + \beta_i)}$$

where $u_{k,vi}$ represents the count of topic k being assigned to word $v_i$ and $u_{dm,k}$ represents the count of topic k being assigned to any word in document $d_m$.

Although LDA is effective in discovering latent topics, the native order of the topics and topic keywords resulting from LDA is not ideal for direct user consumption. The LDA derived topics and topic keywords are statistically inferred and some topics and topic keywords having a high statistical order may not be considered important to a user. Consider, for example, an email collection. In an email collection there may be many emails containing disclaimers or other boilerplate language from which an LDA model would extract topics and topic keywords that a user would not consider important even though they have a high statistical value. Further, in an email collection there may be a large amount of newsletters or junk mail from which an LDA model would extract topics and topic keywords that a user would not consider important. Similarly, in the case of topic keywords, if the collection of text documents was a collection of financial news document then common words in finance, for example 'Wall' and 'Street', would have a high statistical value but not a high importance ranking to the user.

Therefore, referring back to FIG. 2, the present invention includes the step 203 of determining an importance ranking for each topic and the step 204 of determining an importance ranking for each topic keyword. However, in general, the definition of importance may vary from one user to another. As such, the methods used to carry out steps 203 and 204 can vary in order to focus on optimizing the importance rankings based on specific criterion.

In the preferred embodiment of the invention shown in FIG. 3, the step of determining an importance ranking for each topic is carried out by calculating a Laplacian score for each topic 303. The Laplacian score of a topic focuses on discriminating documents from different classes. In other words, the Laplacian score method is motivated by the observation that two similar documents are probably related to the same topic while documents that are dissimilar probably belong to different topics. The Laplacian score of a topic reflects its power in discriminating documents from different classes and preserving the local structure of a document collection. The Laplacian score-based topic ranking method assigns high ranks to those topics with high discriminating power. It consists of five main steps:

1. Represent each document $d_m$ as a node in a graph. Its features are represented by $\theta_m$.
2. Construct the T-nearest neighbor graph based on a similarity matrix S where $S_{ij}=exp\{-d^2_{ij}/2\sigma^2\}$. Here, $d_{ij}$ can be either Euclidian distance or Hellinger distance.
3. Compute graph Laplacian $L=D-S$ where D is a diagonal matrix and $D_{ii}=\Sigma^M_{j=1} S_{ij}$ is the degree of the ith vertex.
4. For each topic $t_k=(\theta_{1,k}, \theta_{2,k}, \ldots, \theta_{M,k})^T \in R^M$, let $$\tilde{t}_k = t_k - \frac{t_k^T D1}{1_k^T D1}1$$

Here, $1=[1, 1, \ldots 1]^T$.
5. Compute the Laplacian score of the k-th topic:

$$L_k = \frac{\tilde{t}_k^T L \tilde{t}_k}{\tilde{t}_k^T D \tilde{t}_k}$$

To find the T-nearest neighbors of a topic, we keep a T-size heap. For each topic, we compute its distances to all the other topics and then check whether to insert it to the heap. Thus, the main time complexity is in graph Laplacian construction which is $O(M^2K+M^2 \log T)$.

The step of determining an importance ranking for each topic is not limited to calculating a Laplacian score.

In another preferred embodiment, the step of determining an importance ranking for each topic is carried out by multiplying a mean distribution of each topic over the collection of text documents times a standard deviation of each topic over the collection of text documents. In this way, the importance ranking is a combination of both content coverage and topic variance. Specifically, the weighted mean distribution is calculated as follows:

$$\mu(z_k) = \frac{\sum_{m=1}^{M} N_m \cdot \hat{\theta}_{m,k}}{\sum_{m=1}^{M} N_m}$$

and the standard deviation is calculated as follows:

$$\sigma(z_k) = \sqrt{\frac{\sum_{m=1}^{M} N_m \cdot (\hat{\theta}_{m,k} - \mu(z_k))^2}{\sum_{m=1}^{M} N_m}}$$

where the weight $N_m$ is the document length.

Then the rank of a topic is defined as:

$$P_k \triangleq (\mu(z_k))^{\lambda_1} \cdot (\sigma(z_k))^{\lambda_2}$$

where $\lambda_1$ and $\lambda_2$ are control parameters. Specifically, if $\lambda_1=1$ and $\lambda_2=0$, the ranking is determined purely by topic coverage. In contrast, if $\lambda_1=0$ and $\lambda_2=1$, the rank is simply determined by topic variance.

In yet another preferred embodiment, the step of determining an importance ranking for each topic is carried out by ranking the topics based on the greatest pair-wise mutual information. The mutual information of two topics measures the information they share or how much knowing one of the topics reduces uncertainty of the other. By ranking the topic with the greatest pair-wise mutual information first it can reduce the uncertainty about the other topics. Specifically, in the preferred embodiment, the following procedure is used to determine the rank of each topic.

1. For $\forall_{i,j}$, first compute $MI/(t_i, t_j)$ based on the topic distributions of $t_i$ and $t_j$. Then construct a complete graph G where the weight of an edge $e_{ti,tj}$ is $MI(t_i, t_j)$.
2. Build the maximal spanning tree MST of the complete graph G.
3. Define the relevant topic set $R_t = \{t_1, t_2, \ldots, t_K\}$ and the corresponding edges in MST.
4. While $|R_t| > 0$,
  4.1. if $\exists v \in G$ that is not connected to the others in $R_t$, remove this topic $t_v$ ($R_t \leftarrow R_t - t_v$).
  4.2. otherwise remove the least weighted edge in $R_t$.
5. Rank the topics according to the order in which they were removed. Rank the topic removed last the highest.

The Prime's algorithm is used to construct the MST. Thus, to compute pairwise mutual information for topic importance needs $O(K_2M)$. By using a heap to construct a priority queue, a MST can be built in $O(|\epsilon|\log|V|) = K^2 \log K$ time since a complete graph is used.

In yet another preferred embodiment, the step of determining an importance ranking for each topic is carried out by using a topic similarity algorithm. The topic similarity algorithm is used to maximize topic diversity and minimize redundancy.

1. For $\forall_{i,j}$ compute the similarity $s_{ij}$ for $\phi_i$ and $\phi_j$ based on maximal information compression index.
2. Sort the similarities for each topic.
3. Define the reduced topic set $R_r = \{\phi_1, \phi_2, \ldots, \phi_K\}$.
4. While $|R_r| > 0$, remove $\phi_j$ in $R_r$ which satisfies $j = \arg \max_i \max_j s_{ij}$.

5. The rank of a topic is determined by the topic removal order. The topic removed the last should rank the highest.

In this algorithm, constructing the similarity scores needs $O(K_2M)$ and sorting the scores needs $O(K_2 \log K)$.

In the preferred embodiment of the invention shown in FIG. 3, the step of determining an importance ranking for each topic also takes into account email meta data 303. All the methods of determining an importance ranking for each topic as described above were application independent. However, application-specific information such as email meta data can be used to calculate a topic's importance. Specifically, if a topic mainly includes email messages that have not been read then this topic will have a lesser importance ranking. In contrast, if a topic includes email messages that not only have been read but also replied to then this topic will have a higher importance ranking. For example, the following reply count can be used to account for email meta data in determining an importance ranking for each topic:

$$r_k^{(reply)} = \sum_m^M \hat{\theta}_{m,k} (\lambda_1 \cdot (\text{\# self reply}) d_m + \lambda_2 \cdot (\text{\# other reply}) d_m)$$

where $(\text{\#self reply})d_m$ is the reply count by the email owner for document dm, $(\text{\#other reply})d_m$ is the reply count by others for document $d_m$, and $\lambda_1$ and $\lambda_2$ are control parameters. To incorporate $r_k(reply)$, this value is multiplied with the values of importance computed from the application independent methods described above, for example, in step 303 the Laplacian score method of computing values of importance are multiplied by $r_k(reply)$.

Referring again to FIG. 3, at step 304 the process determines an importance ranking for each topic keyword using a term frequency-inverse document frequency (tf-idf) metric. Below are two LDA-types of tf-idf scores:

$$\text{Type-I } TFIDF = \frac{\hat{\varphi}_{k,i}}{\sum_{k=1}^{K} \hat{\varphi}_{k,i}}$$

and $$\text{Type-II } TFIDF = \hat{\varphi}_{k,i} \cdot \log \frac{\hat{\varphi}_{k,i}}{\left(\prod_{k=1}^{K} \hat{\varphi}_{k,i}\right)^{\frac{1}{K}}}$$

where TF represents the native value of importance for a topic generated by the LDA model. (TF=$\hat{\varphi}_{k,i}$). The topic proportion sum and topic proportion product are used respectively in Type-I and Type-II TFIDF to re-weight the TF scores.

The importance ranking for each of the topic keywords is based on their importance to a topic and to a specific time frame. The importance ranking of a topic keyword is computed for a time t.

Referring back to FIG. 3, in step 307, the process orders the layers in the graph by balancing the following criteria: (i) layers having less volatility are placed closer to the reference line, (ii) layers representing semantically similar topics are adjacent and (iii) layers are ordered to maximize available space for keywords. The visual summarization produced by the preferred embodiments of the invention is a stacked graph. Meaning each topic current is a layer and each layer is stacked on the layer below it. The stacking order of the topic layers impacts the legibility and aesthetics for the user. Further, the stacking order can also affect the usable space for displaying the topic keywords.

First, the volatility of each topic layer is computed based on its curvature. The volatility metric corresponds to how much the topic strength varies over time. Second, the topic layers are sorted based on their volatility and start times. The least volatile topic with the earliest start time is placed nearest to the x-axis. Third, the next topic layer is added either on the opposite side of the reference line from the first topic layer and stacked on the first topic layer. The next topic layer is selected based on start time, volatility, semantic similarity with the previously added topic, and geometric complementariness with the previous topic. The above criteria can be weighted differently. Geometric complementariness is calculated using the following formula:

$$GC(T_i, T_j) = w_1 \times \frac{\max(d_{ij}(t))}{\sum_t d_{ij}(t)} + w_2 \times F_\sigma(d_{ij}(t)).$$

Here, weights $w_1=0.5$, $w_2=0.5$; $d_{ij}(t)$ is the vertical distance between a pair of points $p_i$ of $T_i$ and $p_j$ of $T_j$ at time t; $F_\sigma$ computes the standard deviation of the pair-wise distances.

The above approach balances all three layer-ordering criteria. First, it places the "flatter" topic currents toward the center of the graph and curvier ones along the edge to minimize the layer distortion. Second, it neighbors geometrically complementary topic currents to maximize the usable space within each layer. Third, it groups semantically similar topic currents together to facilitate topic association and comparison.

In both FIG. 2 and FIG. 3 the processes shown include a step of displaying time-specific topic keyword clouds within the layers of the visual summarization. Laying out these keyword clouds in a topic layer is non-trivial because of competing constraints. For example, it is desirable to display as many keywords as possible to informatively describe a topic but at the same time prevent keywords from overflowing across topic layer boundaries.

In an embodiment of the present invention the keyword placement method considers three factors: (1) temporal proximity, (2) content legibility, and (3) content amount. The first factor states that topic keywords be placed near the most relevant time coordinate. The second criterion requires that keywords be legible, such as avoiding keyword occlusions and overflowing across topic boundaries. The third criterion attempts to maximize the use of available space in a topic current to display as many keywords as allowed. The method follows a two-step algorithm to place topic keywords as a series of keyword clouds along the timeline within a topic current.

To locate suitable space for placing a set of topic keywords relevant to time t within a topic current, the neighborhood of t (t±σ) is searched. Let δ be the time unit (δ=ti+1−ti) and σ<0.5δ to ensure that the keywords be placed near t. To ensure the legibility of topic keywords, a minimal legible font size or above can be required. When evaluating the neighborhood of t, there are three possible outcomes.

First, if there is adequate space to fit a set of keywords (K>=10) in the neighborhood of time t, the space is marked. Second, if there is no adequate space within the allowed neighborhood to fit a single keyword with the minimal legible font, these keywords are merged with those derived at time t+δ. The method then advances to the time point t+δ to look for suitable space. If still unable to find suitable space, the method will drop the keywords at t to ensure temporal proximity of the keyword placement. Otherwise, the space found near t+δ is marked. Third, adequate space is found to fit only a few keywords (K<=3). To avoid visual clutter, there should be an attempt minimize the number of scattered keyword clusters within a topic current. Thus, the method looks ahead to check the space around the time point t+δ. If there is ample space (area>φ), the keywords are merged at t and t+δ and placed near t+δ. If both usable areas near t and t+δ are small, the two areas are combined to fit the merged keywords. The above process repeats itself until every set of keywords is processed.

Any keyword cloud packaging method can be used to package the topic keywords into topic keyword clouds. It is desirable that the method used pack the keywords as tightly as possible.

Figure 4:
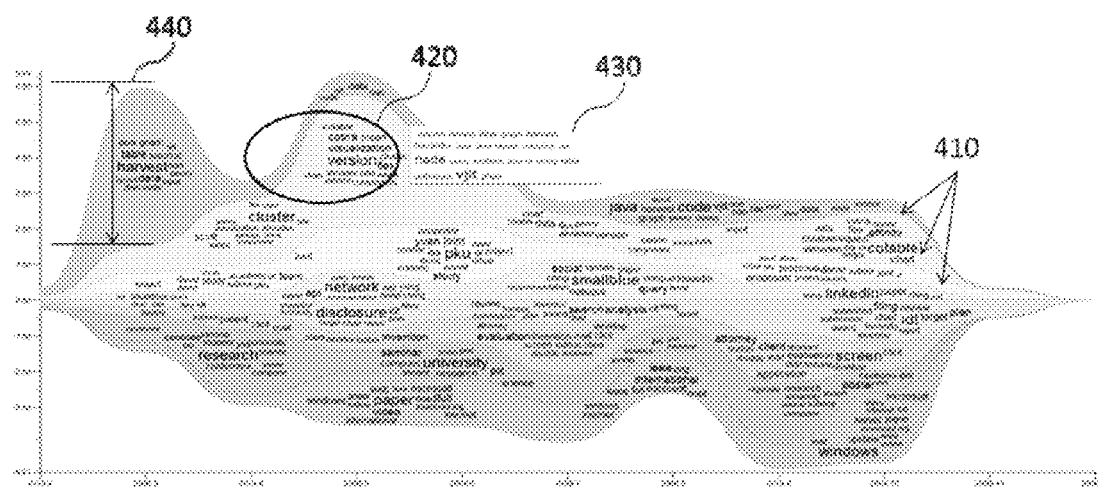
FIG. 4 shows a visual text summarization according to an embodiment of the present invention.

FIG. 4 shows a visual text summarization according to an embodiment of the present invention. In particular, FIG. 4 shows visualization 115a, which is an embodiment of visualization 115 of FIG. 1. In FIG. 4 the topic layers 410 are stacked based on an "inside-out" order such that topic layers are stacked above and below the x-axis. The keyword clouds 420 represent the top N topic keywords within each topic based on a calculated value of importance. In addition to displaying the keyword clouds within a topic layer, a tool tip 430 can be provided to show all the topic keywords associated with the topic. This gives the user a topic overview regardless of its thematic changes. The height of each topic layer 440 varies with the topic strength. If each document includes a time stamp then the topic strength will vary distributed over the time span of the collection of text document. The topic strength for a topic at time t can be calculated using the following formula:

$$S_i[t] = \sum_{e_k \in E(t)} l(e_k) \times P(T_i \mid e_k)$$

Here, $e_k$ is the kth email in collection E(t), which is the set of emails at time t. Function $I(e_k)$ computes the normalized length of email $e_k$, while $P(T_i|e_k)$ calculates the distribution of topic $T_i$ in email $e_k$. Topics with larger topic strength are covered by more documents in the collection. Visually, the topics with larger topic strength appear wider.

Figure 5:
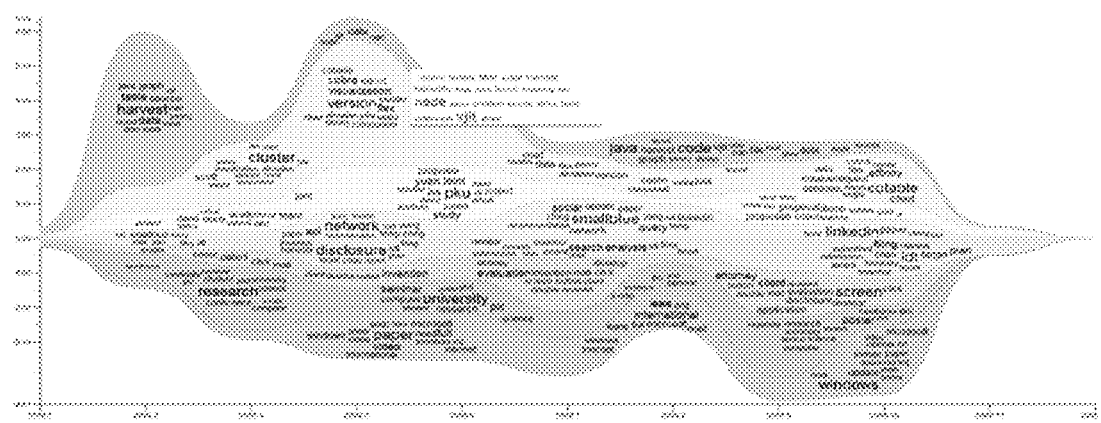
FIG. 5 shows an alternative layout for a visual text summarization according to another embodiment of the present invention.
Figure 6:
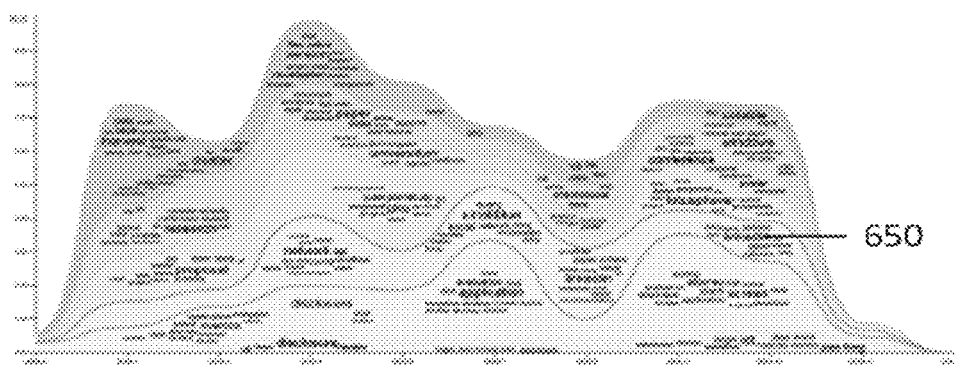
FIG. 6 shows a visual text summarization utilizing a fish eye technique to display more detail of a topic according to an embodiment of the present invention.

FIG. 5 shows an alternative layout for a visual text summarization according to an embodiment of the present invention. In particular, FIG. 6 shows visualization 115b, which is an embodiment of visualization 115 of FIG. 1. The visualization 115b of FIG. 5 is similar to the visualization 115a of FIG. 1, but in FIG. 5 the topic layers 410 are all stacked on top of the x-axis.

FIG. 6 shows a visual text summarization utilizing a fish eye technique to display more detail of a topic according to an embodiment of the present invention. In particular, FIG. 6 shows visualization 115c, which is an embodiment of visualization 115 of FIG. 1. Due to limited space for keywords often only a small subset of topic keywords will be displayed. A user can interactively request more information about a topic by zooming in on the topic. The preferred embodiment of the present invention shown in FIG. 6 uses a fisheye view technique known in the art to display more details of a selected topic 650.

Figure 7:
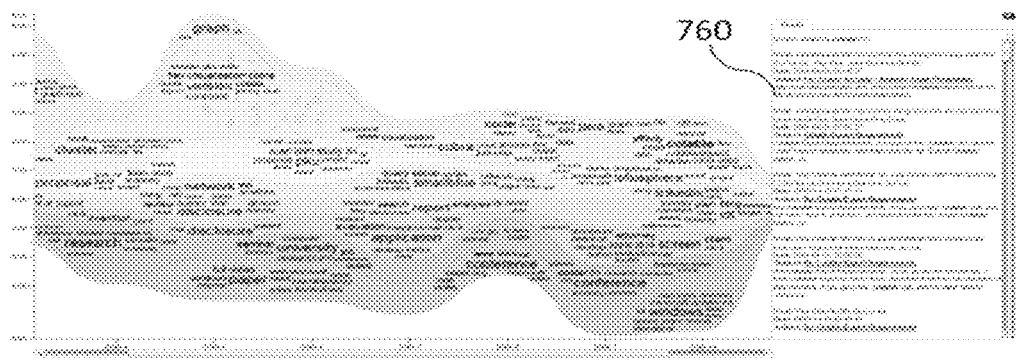
FIG. 7 shows a visual text summarization displaying sender and receiver meta data according to an embodiment of the present invention.

FIG. 7 shows a visual text summarization displaying sender and receiver meta data 760 according to an embodiment of the present invention. The meta data displayed does not need to be sender and receiver data. For example, the meta data displayed can include authors or source information. Further, multiple views can be displayed simultaneously to coordinate analysis.

Figure 8:
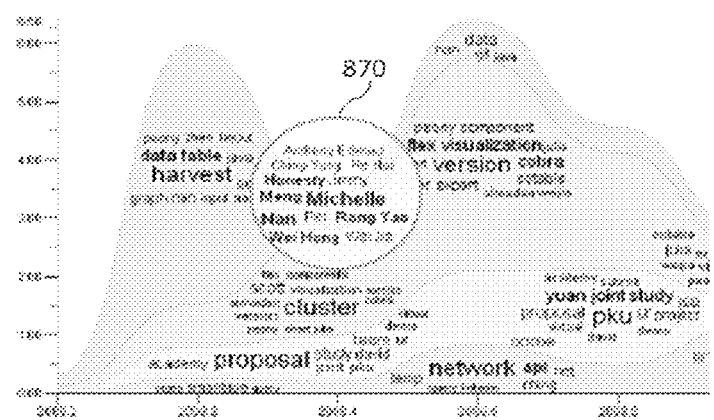
FIG. 8 shows a visual text summarization displaying snippets of text documents relevant to a specific topic keyword according to an embodiment of the present invention.

FIG. 8 shows a visual text summarization displaying snippets 870 of text documents relevant to a specific topic keyword according to an embodiment of the present invention. It is often necessary to examine the meaning of topic keywords in the context of the original text information. To do so, the present invention can allow for a full text document to be selected from the visual summarization. Additionally, the present invention allows for displaying snippets 870 from multiple text documents as shown in FIG. 8.

Figure 9:
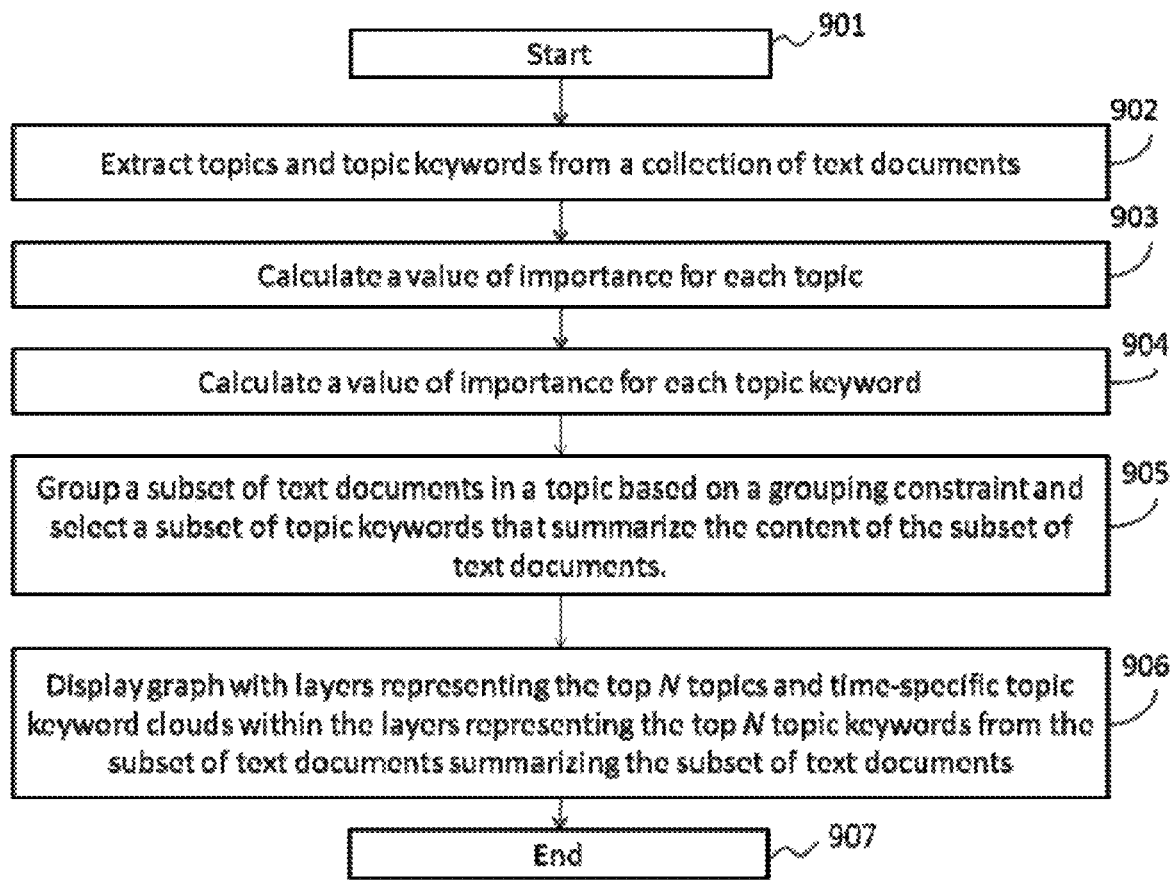
FIG. 9 shows a process flowchart of another preferred embodiment of the present invention.

FIG. 9 shows a process flowchart for another preferred embodiment of the present invention. Steps 901-904 are the same steps as steps 201-204 from FIG. 2 and therefore a detailed description of those steps is omitted. In step 905 the process groups together a subset of text documents in a topic based on a grouping constraint and selects a subset of topic keywords that summarize the content of the subset of text documents. In step 906 the process displays a graph with layers representing the top N topics and displays time-specific topic keyword clouds within the layers representing the top N topic keywords from the subset of text documents summarizing the subset of text documents. Then, the process ends at step 907.

To support more sophisticated text analytics such as topic trend analysis there is a need to drill down to a particular topic and derive additional information for each topic. In the preferred embodiment of the present invention shown in FIG. 9 a multi-faceted topic keyword selection method is employed in which documents within a particular topic are further grouped based on certain grouping constraints. Additionally, the most appropriate topic keywords are selected to summarize the content of each group. Depending on the grouping constraints employed, the proposed method can be used to solve different problems. For example, the documents in a topic can be grouped by time. Thus, the topic keywords selected for each group along the time line reflect the content evolution of a topic. In addition, if the documents are grouped based on geographic regions, the keywords selected convey the topic variance across different geo-regions. Similarly, other grouping aspects such as author, affiliation or document source can be employed.

Two types of general grouping constraints include "must-link" and "cannot-link". For example, for time-based topic summarization, if all the documents are sorted based on their time stamps, then there is a must-link between documents from adjacent time stamps. For geographic region based topic summarization, there is a must-link between documents from the same geo-region and cannot-link between those from different geo-regions. An author-based keyword selection can also be formulated similarly. Without loss of generality, it is assumed words can have pairwise constraints.

An embodiment of the present invention uses a novel biHMRF (two-sided hidden Markov random field) regularized information theoretic co-clustering algorithm (biHMRF-ITCC) to group documents. Information theoretic co-clustering is used since it can co-cluster documents and words and find the cluster relationships. Employing document clustering is more flexible than using fixed topic segmentation. For example, for time-based topic segmentation, if a topic is segmented based on fixed time points such as every month, if the document contents from two adjacent months are very similar, the same set of topic keywords may be repeatedly displayed for both months. In contrast, with document clustering, document sets can be combined to avoid redundancy. Moreover, the information theoretic co-clustering algorithm does not restrict the number of document and word clusters to be the same. Thus, groups of documents can be extracted that share the same keyword clusters so that different document clusters may share the same keywords.

Figure 10:
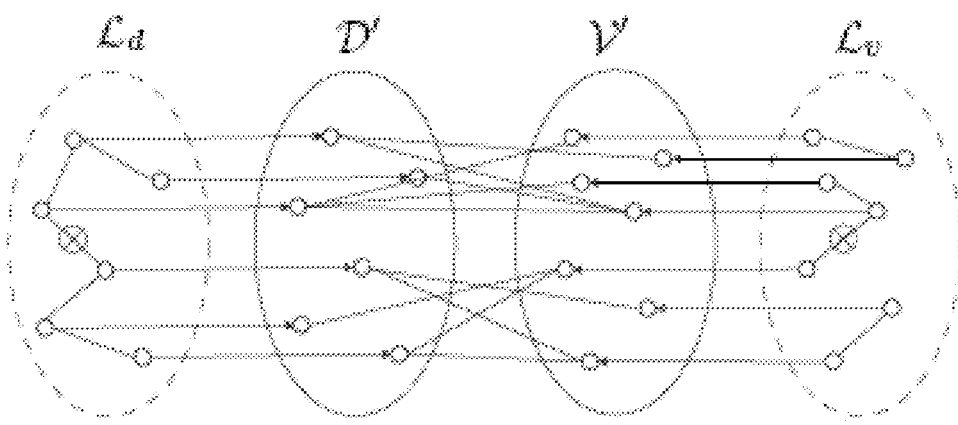
FIG. 10 shows an illustration of two-sided hidden Markov random field regularized Information Theoretic Co-Clustering.

FIG. 10 shows an illustration of two-sided hidden Markov random field regularized Information Theoretic Co-Clustering. The documents and words from a topic are denoted as $D'=\{d_1, d_2, \ldots, d_{M'}\}$ and $V'=\{v_1, v_2, \ldots, v_{V'}\}$, respectively. Both D' and V' can be obtained easily from the LDA inference results. The co-occurrence count for $d_m$ and $v_i$ is denoted as $u_{dm,vi}$. The joint probability of $p(d_m, v_i)$ can be computed. Since it is a hard clustering problem, a variational function:

$$q(d_m, v_i, \hat{d}_{k_d}, \hat{v}_{k_v}) = p(\hat{d}_{k_d}, \hat{v}_{k_v}) p(d_m | \hat{d}_{k_d}) p(v_i | \hat{v}_{k_v})$$

is used to approximated $p(d_m, v_i)$ by minimizing the Kullback-Leibler (KL) divergence, where $d_{kd}$ and $v_{kv}$ are cluster indicators, $k_d$ and $k_v$ are cluster indices, and $K_d$ and $K_v$ are the numbers of documents and word clusters.

As shown in FIG. 10, two latent label sets are introduced $L_d = \{l_{d1}, l_{d2}, \ldots, l_{dM'}\}$ and $L_v = \{l_{v1}, l_{v2}, \ldots l_{vV'}\}$. $u_{dm,vi}$ is also regarded as observed random variables. Then the original information theoretic co-clustering problem can be formulated as the log-likelihood of a conditional probability in the exponential family:

$$p(D', V' | L_d, L_v) = \exp(-D_{KL}(p(D', V', \hat{D}, \hat{V}) \| q(D', V', \hat{D}, \hat{V})) b_{\phi KL}(\cdot)$$

where $b_{\phi KL}(\cdot)$ is a normalization constant determined by its divergency type $\hat{D}$ and $\hat{V}$ are the center sets.

Next, the prior distributions are formulated for both latent labels. Here, the focus is on deriving the prior for $L_d$. The derivation for $L_v$ is relatively simple. First, for Latent variables $l_{dm}$, a neighborhood graph is constructed based on the must-links and cannot-links. For a document $d_m$, the must-link set is denoted as $M_{dm}$, and the cannot-link set is $C_{dm}$. Moreover, the neighbor set for $d_m$ is defined as $N_{dm} = \{M_{dm}, C_{dm}\}$. The random field defined on this neighborhood graph is a Markov random field, following the Markov property: $p(l_{dm} | L_d - \{l_{dm}\}) = p(l_{dm} | l_{dm} \in N_{dm})$. Then the configuration of the latent label set can be expressed as a Gibbs distribution. Following the generalized Potts energy function and its extension, the following equation is derived:

$$p(L_d) = \frac{1}{Z_d} \exp\left(-\sum_{d_{m_1}}^{M'} \sum_{d_{m_2} \in Nd_{m_1}} V(d_{m_1}, d_{m_2})\right)$$

For must-links, the energy function is:

$$V(d_{m1}, d_{m2} \in M_{dm1}) = a_{ij} D_{KL}(p(V'|d_{m1}) \| p(V'|d_{m2})) \cdot l_{ldm1 \neq ldm2}$$

For cannot-links, the energy function is:

$$V(d_{m1}, d_{m2} \in C_{dm1}) = \overline{a}_{ij}(D_{max} - D_{KL}(p(V'|d_{m1}) \| p(V'|d_{m2}))) \cdot l_{ldm1 = ldm2}$$

where $p(V'|d_{m1})$ denotes a multinomial distribution based on the probabilities $(p(v_1|d_{m1}), \ldots, p(v_{V'}|d_{m1}))^T$, and $D_{max}$ is the maximum value for all the $D_{KL}(p(V'|d_{m1}) \| p(V'|d_{m2}))$ and $l_{true} = 1$ and $l_{false} = 0$.

Therefore, the constraint co-clustering problem can be formulated as an MAP estimation problem for label configurations:

$$p(L_d, L_v | D', V') \propto p(D', V' | L_d, L_v) p(L_d) p(L_v)$$

As there are two HMRF priors for $L_d$ and $L_v$, this is called biHMRF regularization. Moreover, the objective function can be rewritten as:

$$\{\mathcal{L}_d, \mathcal{L}_v\} = \operatorname{argmin} D_{KL}(p(\mathcal{D}', \mathcal{V}', \hat{\mathcal{D}}, \hat{\mathcal{V}}) \| q(\mathcal{D}', \mathcal{V}', \hat{\mathcal{D}}, \hat{\mathcal{V}})) +$$

$$\sum_{d_{m_1}}^{M'} \sum_{d_{m_2} \in \mathcal{M}_{d_{m_1}}} V(d_{m_1}, d_{m_2} \in \mathcal{M}_{d_{m_1}}) +$$

$$\sum_{d_{m_1}}^{M'} \sum_{d_{m_2} \in C_{d_{m_1}}} V(d_{m_1}, d_{m_2} \in C_{d_{m_1}}) +$$

$$\sum_{v_{i_1}}^{V'} \sum_{v_{i_2} \in \mathcal{M}_{v_{i_1}}} V(v_{i_1}, v_{i_2} \in \mathcal{M}_{v_{i_1}}) + \sum_{v_{i_1}}^{V'} \sum_{v_{i_2} \in C_{v_{i_1}}} V(v_{i_1}, v_{i_2} \in C_{v_{i_1}})$$

Since the two sets of latent variables as well as the variational probability are intractable to estimate simultaneously, an alternating expectation maximization (Alternating EM) algorithm is proposed to solve the problem.

Following is an algorithm of an alternating EM algorithm for biHMRF-ITCC.

Algorithm—Alternative EM for biHMRF-ITCC
1. Input: Document word co-occurrence data D' and V'; cluster number $k_d$ and $k_v$; pairwise constraints M and C.
2. Initialize penalty measure $D_{KL}(p(V'|d_{m1}) \| p(V'|d_{m2}))$ and $D_{KL}(p(D'|v_{i1}) \| p(D'|v_{i2}))$.
3. Initialize document and word cluster labels using k-means.
4. Initialize: $q^{(0)}(\hat{d}_{kd}, \hat{v}_{kv})$, $q^{(0)}(d_m|\hat{d}_{kd})$ and $q^{(0)}(v_i, \hat{v}_{kv})$
5. while t<maxIter and δ>maxδ do
    a. Document E-Step: computer document clusters using ICM algorithm to minimize $$\mathcal{L}_d^{(t+1)} = \operatorname{argmin} \sum_{k_d}^{K_d} \sum_{d_m: l_{d_m} = k_d} p(d_m) D_{KL}(p(\mathcal{V}' \mid d_m) \| p(\mathcal{V}' \mid \hat{d}_{k_d})) +$$

$$\sum_{d_{m_1}}^{M'} \sum_{d_{m_2} \in \mathcal{M}_{d_{m_1}}} V(d_{m_1}, d_{m_2} \in \mathcal{M}_{d_{m_1}}) + \sum_{d_{m_1}}^{M'} \sum_{d_{m_2} \in C_{d_{m_1}}} V(d_{m_1}, d_{m_2} \in C_{d_{m_1}})$$

b. Document M-Step: update parameters $$q^{(t+1)}(\hat{d}_{kd}, \hat{v}_{kv}), q^{(t+1)}(d_m|\hat{d}_{kd}) \text{ and } q^{(t+1)}(v_i, \hat{v}_{kv})$$

c. Word E-Step: compute document clusters using ICM algorithm to minimize $$\mathcal{L}_v^{(t+2)} = \operatorname{argmin} \sum_{k_v}^{K_v} \sum_{v_i: l_{v_i} = k_v} p(v_i) D_{KL}(p(\mathcal{D}' \mid v_i) \| p(\mathcal{D}' \mid \hat{v}_{k_v})) +$$

$$\sum_{v_{i_1}}^{V'} \sum_{v_{i_2} \in \mathcal{M}_{v_{i_1}}} V(v_{i_1}, v_{i_2} \in \mathcal{M}_{v_{i_1}}) + \sum_{v_{i_1}}^{V'} \sum_{v_{i_2} \in C_{v_{i_1}}} V(v_{i_1}, v_{i_2} \in C_{v_{i_1}})$$

d. Word M-Step: update parameters $$q^{(t+2)}(\hat{d}_{kd}, \hat{v}_{kv}), q^{(t+2)}(d_m|\hat{d}_{kd}) \text{ and } q^{(t+2)}(v_i, \hat{v}_{kv})$$

e. Compute $q^{(t+2)}(v_i|\hat{d}_{kd})$.
    f. Compute cost $\text{cost}^{(t+2)}$ using the objective function from above and compute $\delta = (\text{cost}^{(t+2)} - \text{cost}^{(t)})/\text{cost}^{(t)}$
6. end while.

The KL divergency can be expressed by a weighted sum of KL divergencies:

$$D_{KL}(p(\mathcal{D}', \mathcal{V}', \hat{\mathcal{D}}, \hat{\mathcal{V}})) = \sum_{k_d}^{K_d} \sum_{d_m: l_{d_m} = k_d} p(d_m) D_{KL}(p(\mathcal{V}' \mid d_m) \| p(\mathcal{V}' \mid \hat{d}_{k_d}))$$

$$= \sum_{k_v}^{K_v} \sum_{v_i: l_{v_i} = k_v} p(v_i) D_{KL}(p(\mathcal{D}' \mid v_i) \| p(\mathcal{D}' \mid \hat{v}_{k_v}))$$

where $p(V'|\hat{d}_{kd})$ denotes a multinomial distribution based on the probabilities $(p(v_1|\hat{d}_{kd}), \ldots, p(v_{V'}|\hat{d}_{kd}))^T$, $p(v_i|\hat{d}_{kd}) = p(v_i|\hat{v}_{kv})p(\hat{v}_{kv}|\hat{d}_{kd})$ and $p(v_i|\hat{v}_{kv}) = p(v_i)/p(l_{vi} = \hat{v}_{kv})$ due to hard clustering labels. Symmetrically, the probability for words can be defined as: $p(D'|\hat{v}_{kv})$ denotes a multinomial distribution based on the probabilities $(p(d_1|\hat{v}_{kv}), \ldots, p(d_{V'}|\hat{v}_{kv}))^T$, $p(d_i|\hat{v}_{kv}) = p(d_i|\hat{d}_{kd})p(\hat{d}_{kd}|\hat{v}_{kv})$ and $p(d_i|\hat{d}_{kd}) = p(d_i)/p(l_{di} = \hat{d}_{kd})$ due to hard clustering labels. Thus, the optimization process can be alternated. First, the algorithm fixes $L_v$ and minimizes the objective of the objective function w.r.t $L_d$. Then, it fixes $L_d$ and minimizes the objective of the objective function in w.r.t $L_v$ until convergence.

When $L_v$ is fixed, the objective function for $L_d$ is rewritten as:

$$\mathcal{L}_d = \operatorname{argmin} \sum_{k_d}^{K_d} \sum_{d_m: l_{d_m} = k_d} p(d_m) D_{KL}(p(\mathcal{V}' \mid d_m) \| p(\mathcal{V}' \mid \hat{d}_{k_d})) +$$

$$\sum_{d_{m_1}}^{M'} \sum_{d_{m_2} \in \mathcal{M}_{d_{m_1}}} V(d_{m_1}, d_{m_2} \in \mathcal{M}_{d_{m_1}}) + \sum_{d_{m_1}}^{M'} \sum_{d_{m_2} \in C_{d_{m_1}}} V(d_{m_1}, d_{m_2} \in C_{d_{m_1}})$$

Optimizing this objective function still is computationally intractable. Here, a general EM algorithm is used to find the estimation. In the E-Step, the cluster labels are updated based on model parameters q from the last iteration. In the M-Step, the model parameters q are updated by fixing the cluster labels.

In the E-Step, an iterated conditional modes (ICM) algorithm is used to find the cluster labels. ICM greedily solves the optimization problem by updating one latent variable at a time, and keeping all the other latent variables fixed. Here, we derive the label $l_{dm}$ by:

$$l_{d_m} = \arg\min_{l_{d_m} = k_d} \sum_{v_i = 1}^{V'} D_{KL}(p(\mathcal{V}' \mid d_m) \| p(\mathcal{V}' \mid \hat{d}_{k_d})) +$$

$$\sum_{d_m' \in \mathcal{M}_{d_m}: l_{d_m} \neq l_{d_m'}} D_{KL}(p(\mathcal{V}' \mid d_m) \| p(\mathcal{V}' \mid d_m')) +$$

$$\sum_{d_m' \in C_{d_m}: l_{d_m} = l_{d_m'}} (D_{max} - D_{KL}(p(\mathcal{V}' \mid d_m) \| p(\mathcal{V}' \mid d_m')))$$

In the M-Step, since the latent labels are fixed, the update of variational function q is not affected by the must-links and cannot-links. Thus, the following function can be updated:

$$q(\hat{d}_{k_d}, \hat{v}_{k_v}) = \sum_{l_{d_m} = k_d} \sum_{l_{v_i} = k_v} p(d_m, v_i)$$

$$q(d_m \mid \hat{d}_{k_d}) = \frac{q(d_m)}{q(l_{d_m} = k_d)} [q(d_m \mid \hat{d}_{k_d}) = 0 \text{ if } l_{d_m} \neq k_d]$$

$$q(v_i \mid \hat{v}_{k_v}) = \frac{q(v_i)}{q(l_{v_i} = k_v)} [q(v_i \mid \hat{v}_{k_v}) = 0 \text{ if } l_{v_i} \neq k_v]$$

The algorithm Algorithm—"Alternative EM for biHMRF-ITCC", described above, summarizes the main steps in the algorithm. Algorithm biHMRF-ITCC monotonically decreases the objective function to local optimum. This is easy to prove since the ICM algorithm decreases the objective to local optimum given fixed q parameters. Then the update of q is monotonically decreasing.

The time complexity of biHMRF-ITCC algorithm is $O((nz+(nc*iter_{ICM}))\cdot(K_d+K_v))\cdot iter_{AEM}$, where nz is the non-zero number of document-word co-occurrences, nc is the constraint number, $iter_{ICM}$ is the ICM iteration number in the E-Step, $K_d$ and $K_v$ are the cluster numbers, and $iter_{AEM}$ is the iteration number of the alternating EM algorithm.

Given the co-clustering results for a document set, the keywords for document cluster can be extracted. The keyword selection algorithm has two main steps: First, a filter is used to smooth the labels estimated from the Markov random field. We use a window of size 50 to smooth the adjacent document labels. The cluster label is re-assigned using the label most frequently appeared in the window. Then the output labels will be smoothed and divided into several segments. Second, for each segment with a cluster label, its keywords are extracted. Given a cluster label, its corresponding keyword clusters can be obtained by $q(\hat{d}_{k_d}, \hat{v}_{k_v})$. The probabilities $q(\hat{d}_{k_d}, \hat{v}_{k_v})$ for $k_v=1, 2, \ldots, K_v$ represent how a keyword cluster is associated with a document cluster. Then, relevant keyword clusters are defined as those whose probabilities are higher than the mean value of these probabilities. Then, the keyword rank is determined by:

$$r_{v_i}^{(subset)} = \sum_{k_v \in relelvent\ set} q(\hat{d}_{k_d}, \hat{v}_{k_v}) q(v_i | \hat{v}_{k_v})$$

The rank values are then sorted so that top keywords can be retrieved.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of producing a visual text summarization, the method comprising the steps of:
    extracting a plurality of topics from a collection of text documents, wherein each of the topics comprises a plurality of topic keywords;
    determining an importance ranking for each of the topics;
    determining an importance ranking for each of the topic keywords of a topic;
    displaying a graph having a plurality of stacked layers representing a group of topics selected from the plurality of topics based on the importance ranking of the topics;
    grouping a subset of text documents included in a topic, wherein the grouping is based on a grouping constraint;
    selecting a subset of topic keywords included in the topic, wherein the subset of topic keywords summarize a content of the subset of text documents, wherein the at least one keyword cloud displayed within each layer of the graph is the subset of topic keywords that summarize the content of the subset of text document grouped based on the grouping constraint; and
    displaying at least one keyword cloud within each layer of the graph, wherein the at least one keyword cloud is a group of topic keywords selected from the extracted topic keywords based on the importance ranking of the extracted topic keywords;
    wherein at least one of the steps is carried out using a computer device.

2. The method of claim 1, further comprising a step of ordering the layers in the graph, wherein a criterion for the ordering is that layers representing semantically similar topics are adjacent.

3. The method of claim 1, further comprising a step of ordering the layers in the graph, wherein a criterion for the ordering is that layers having less volatility are placed closer to an axis than layers having more volatility.

4. The method of claim 1, further comprising a step of ordering the layers in the graph, wherein a criterion for the ordering is that layers with geometric complementariness are adjacent.

5. The method of claim 1, wherein extracting the plurality of topics from the collection of text documents is carried about by using a latent semantic model.

6. The method of claim 1, wherein the step of determining the importance ranking for each of the topics is carried out by calculating a value of importance by multiplying a mean distribution of each topic over the collection of text documents times a standard deviation of each topic over the collection of text documents and ranking each topic based on the value of importance.

7. The method of claim 1, wherein the step of determining the importance ranking for each of the topics is carried out by calculating a Laplacian score for each of the topics and ranking each topic based on the Laplacian score.

8. The method of claim 1, wherein the collection of text documents is a collection of emails and the step of determining the importance ranking for each of the topics takes into account a read history and a reply history of the emails covered by each of the topics.

9. The method of claim 1, wherein the step of determining the importance ranking for each of the topic keywords of a topic uses a term frequency-inverse document frequency (tf-idf) metric.

10. The method of claim 1, wherein the layers in the graph are located on both sides of an axis.

11. The method of claim 1, wherein the layers in the graph are located on one side of an axis.

12. The method of claim 1, further comprising a step of coloring the layers in the graph, wherein layers representing semantically similar topics use a same color with different hues.

13. The method of claim 1, wherein the keyword clouds are associated with a relevant time and the step of displaying the at least one keyword cloud within each layer is carried out by placing the at least one keyword cloud near the relevant time.

14. The method of claim 13, wherein the keyword clouds include more topic keywords the more space there is to depict the keyword clouds within each layer near the relevant time.

15. The method of claim 1, further comprising the step of displaying all of the topic keywords of a topic in a tool tip.

16. The method of claim 1, further comprising the step of displaying more topic keywords of a topic within each of the keyword clouds.

17. The method of claim 1, further comprising the step of displaying snippets of text documents relevant to a topic keyword.

18. The method of claim 1, further comprising the step of displaying meta data associated with the collection of text documents.

19. A non-transitory computer readable storage having computer readable instructions which when executed causes a computer to carry out the steps of a method comprising the steps of:

- extracting a plurality of topics from a collection of text documents, wherein each of the topics comprises a plurality of topic keywords;
- determining an importance ranking for each of the topics;
- determining an importance ranking for each of the topic keywords of a topic;
- displaying a graph having a plurality of stacked layers representing a group of topics selected from the plurality of topics based on the importance ranking of the topics;
- grouping a subset of text documents included in a topic, wherein the grouping is based on a grouping constraint;
- selecting a subset of topic keywords included in the topic, wherein the subset of topic keywords summarize a content of the subset of text documents, wherein the at least one keyword cloud displayed within each layer of the graph is the subset of topic keywords that summarize the content of the subset of text document grouped based on the grouping constraint; and
- displaying at least one keyword cloud within each layer of the graph, wherein the at least one keyword cloud is a group of topic keywords selected from the extracted topic keywords based on the importance ranking of the extracted topic keywords;
- wherein at least one of the steps is carried out using a computer device.

* * * * *